United States Patent
Letschert et al.

(10) Patent No.: US 9,187,617 B1
(45) Date of Patent: Nov. 17, 2015

(54) NICKEL-FREE GREEN PIGMENT

(71) Applicant: Ferro Corporation, Mayfield Heights, OH (US)

(72) Inventors: Hans-Peter Letschert, Hanau (DE); Stephan Ludwig, Neuberg Ravolzhausen (DE); Terry J. Detrie, Washington, PA (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 14/296,401

(22) Filed: Jun. 4, 2014

(51) Int. Cl.
| | |
|---|---|
| C09C 1/00 | (2006.01) |
| C09C 1/22 | (2006.01) |
| C09C 1/36 | (2006.01) |
| C09C 1/40 | (2006.01) |
| C08K 3/26 | (2006.01) |
| C08K 3/22 | (2006.01) |

(52) U.S. Cl.
CPC ... *C08K 3/26* (2013.01); *C08K 3/22* (2013.01); *C08K 3/2279* (2013.01); *C08K 2003/2241* (2013.01); *C08K 2003/2251* (2013.01); *C08K 2003/262* (2013.01)

(58) Field of Classification Search
CPC .............. C09C 1/00; C09C 1/22; C09C 1/36; C09C 1/40
See application file for complete search history.

(56) References Cited

U.S. PATENT DOCUMENTS

| | | |
|---|---|---|
| 3,216,954 A | 11/1965 | Howk et al. |
| 4,075,029 A | 2/1978 | Nuss |
| 4,159,207 A | 6/1979 | Nuss |
| 4,202,702 A | 5/1980 | Nuss |
| 4,289,745 A | 9/1981 | Patil |
| 5,501,733 A * | 3/1996 | Macaudiere et al. ......... 106/461 |
| 6,171,383 B1 | 1/2001 | Sakoske et al. |
| 6,174,360 B1 | 1/2001 | Sliwinski et al. |
| 6,221,147 B1 | 4/2001 | Sakoske et al. |
| 6,416,868 B1 | 7/2002 | Sullivan et al. |
| 6,454,848 B2 | 9/2002 | Sliwinski et al. |
| 6,485,557 B1 | 11/2002 | Swiler |
| 6,503,316 B1 | 1/2003 | Sakoske et al. |
| 6,541,112 B1 | 4/2003 | Swiler et al. |
| 6,582,814 B2 | 6/2003 | Swiler et al. |
| 6,680,121 B2 | 1/2004 | Sakoske et al. |
| 7,014,701 B2 | 3/2006 | Stewart et al. |
| 8,580,028 B2 | 11/2013 | Nuccetelli et al. |
| 2012/0196126 A1 | 8/2012 | Axtell, III et al. |

* cited by examiner

*Primary Examiner* — Pegah Parvini
(74) *Attorney, Agent, or Firm* — Rankin, Hill & Clark LLP

(57) ABSTRACT

A green pigment is a blend of metal oxides including a [124] spinel which can contain certain combinations of lithium, sodium, cobalt, zinc, calcium, magnesium, copper, titanium, manganese, tin, and germanium, and a [134] spinel which can contain certain combinations of lithium, sodium, chromium, boron, iron, manganese aluminum, titanium, tin and germanium. The pigment lacks nickel.

22 Claims, 1 Drawing Sheet

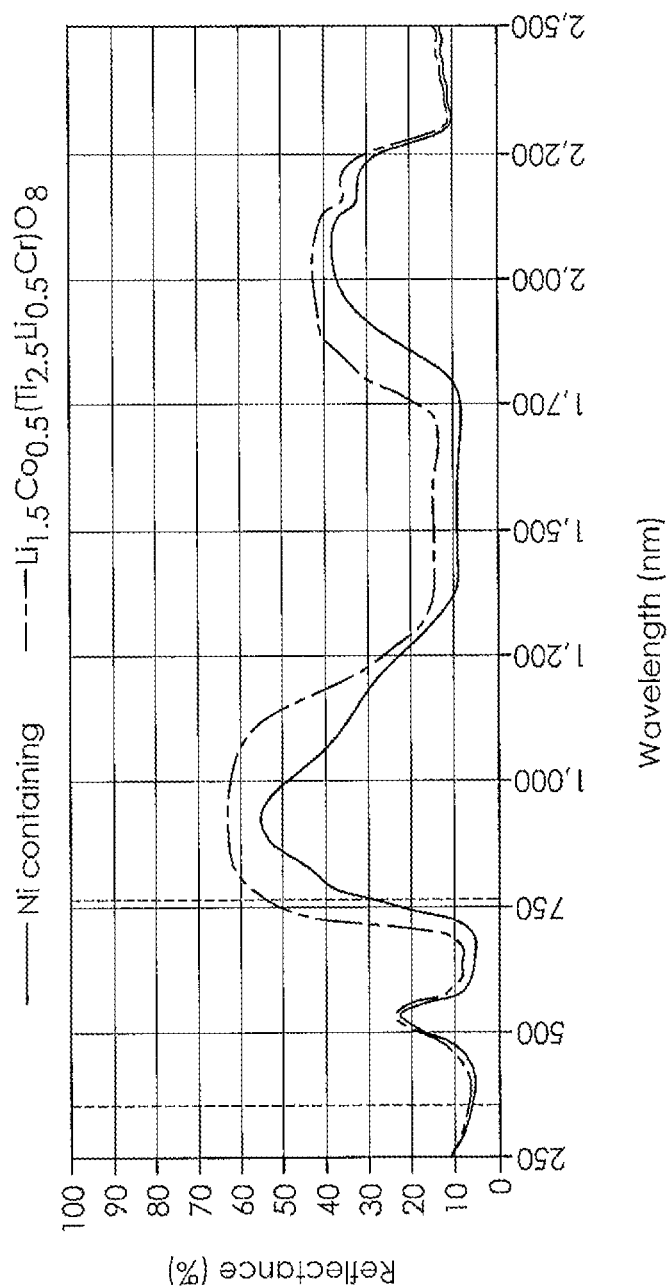

NICKEL-FREE GREEN PIGMENT

BACKGROUND OF THE INVENTION

1. Field of Invention

The subject disclosure generally relates to pigment compositions and method of making pigment compositions.

This invention relates to a green pigment that lacks nickel in any form and a method of making it. The pigment is a solid solution of metal oxides including a [124] spinel which can contain certain combinations of lithium, sodium, cobalt, zinc, calcium, magnesium, copper, titanium, manganese, tin, and germanium, and a [134] spinel which can contain certain combinations of lithium, sodium, chromium, boron, iron, manganese aluminum, titanium, tin and germanium.

The green pigment produces colors similar to nickel containing green pigments and provides high hue angle and high TSR (total solar reflectance).

2. Description of Related Art

Pigments are widely used in various applications such as paints, inks, plastics, rubbers, ceramics, enamels, and glasses. There are various reasons for using inorganic pigments. Among these are the coloristic properties of the pigments, their visible as well as ultraviolet (UV) and infrared (IR) reflectance characteristics, their light fastness and their high temperature stability. The high temperature stability is necessary when the objects being colored are produced at elevated temperatures.

Pigments exhibit certain colors because they selectively reflect and absorb certain wavelengths of light. White light is an approximately equal mixture of the entire visible spectrum of light. When white light encounters a colored pigment, some wavelengths are absorbed as they interact with the electronic structure of the pigment. These interactions are determined by the chemistry and crystal structure of the pigment. The wavelengths not absorbed are reflected back to the observer, and this reflected visible light spectrum creates the appearance of a color. For example, ultramarine reflects blue light, typically between 400 and 500 nanometers in wavelength, and absorbs visible light of other wavelengths.

The appearance of pigments is also dependent upon the spectrum of the source light. Sunlight has a high color temperature and a fairly uniform spectrum, and is considered a standard for white light. Artificial light sources, including fluorescent light, tend to have great peaks in some regions of their spectrum, and deep valleys in other regions. Viewed under these conditions, pigments may exhibit different colors.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An inorganic pigment in the green color space is the spinel $Ti(Co_x,Ni_y,Zn_z)O8$ (x+y+z=2). The disadvantage of that compound is that the nickel leaches easily, which leads to a toxic labeling of such pigments.

Additionally, in the turquoise color space $CoLi(Ti_3Li)O_8$ is known as a pigment but it is closer to blue than green in color shade.

Accordingly, improvements in nickel-free pigments in the green color space are needed.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention can be employed. Other objects, advantages and novel features of the invention will become apparent from the following detailed description of the invention when considered in conjunction with the drawings.

BRIEF DESCRIPTION OF THE DRAWINGS

FIG. 1 shows a UV-VIS0NIR Spectra of Inventive $Li_{1.5}CO_{0.5}(Ti_{2.5}Li_{0.8}Cr)O_8$ and Ferro's Conventional Nickel-containing green pigment (BO3433).

DETAILED DESCRIPTION OF THE INVENTION

The inventors herein began working systematically to develop a greener inorganic pigment that is nickel free by changing the composition of the turquoise $CoLi(Ti_3Li)O_8$ by modification of the composition. $Co^{II}Li^I(Ti^{IV}_3Li^I)O_8$ could be described as a [124] spinel from the oxidation states of the involved metals. The general formula of a spinel is $A_2(B_4)O_8$, where cation A is in tetrahedral coordination and cation B is in octahedral coordination. By changing the ratio of Li and Co in this compound color shade can be changed but the color is still in the turquoise (bluish) color range, for example $CoLi(Ti_3Li)O_8$ to $Co_{1.5}(Ti_3Li)O_8)$.

The spinel structure remains also even if the ratio of the elements does not exactly fit the theoretical composition. In this case the electroneutrality is preserved by creating cation or anion vacancies. These vacancies also influence the color of the spinel. The inventors have discovered that by reducing the Li content of $CoLi(Ti_3Li)O_8$ by 0.5 mol to $CoLi_{0.5}Me_{0.5}(Ti_3Li)O_8$, where Me is a univalent metal or metalloid, the color is shifted to the greener color space.

It is also possible to incorporate other elements into the same [124] spinel structure like: Cu, Zn, Mg, and Ca, instead of Co or Li, such exchange of the elements in the A position of the spinel resulting in various colors: $CoCu_{0.5}(Ti_3Li)O_8$ (dark grey), $Co_{0.5}Zn_{0.5}Li(Ti_3Li)O_8$ (light turquoise), $Co_{0.5}Zn_{0.1}Li(Ti_3Li)O_8$ (light turquoise), $Co_{0.5}Cu(Ti_3Li)O_8$ (dark green gray), $Co_{0.5}Mg_{0.5}Li(Ti_3Li)O_8$ (light turquoise). However, such trials still do not shift the color into the color space of the Ni containing series $Ti(Co_x,Ni_y,Zn_z)O_8$.

Beside the [124] spinels also [134] spinels of the general formula $A^I(B^{III}C^{IV})O_8$ are possible such as: $LiAlMnO_8$, $LiFeTiO_8$ or $LiCrTiO_8$. The last mentioned is dirty buff colored.

The inventors found that the latter compound, which could be also written as $Li_2(Cr_2Ti_2)O_8$ could be used to form solid solutions with the turquoise colored [124] spinel $CoLi(Ti_3Li)O_8$ in any ratio. For example a 1:1 solid solution:

$$Li_2(Cr_2Ti_2)O_8 + CoLi(Ti_3Li)O_8 \rightarrow Li_3Co(Ti_5LiCr_2)O_{16} = Li_{1.5}Co_{0.5}(Ti_{2.5}Li_{0.5}Cr)O_8.$$

This last mentioned compound is interesting since it is colored like the Ni containing $Ti(Co_x,Ni_y,Zn_z)O_4$ where x+y+z=2.

Ferro Corporation's standard nickel-containing pigment $Ti(Co_x,Ni_y,Zn_z)O_8$ (x+y+z=2) named BO3433 has a hue angle of 150.6° whereas the compound 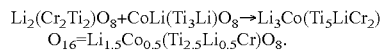

$(Ti_{2.5}Li_{0.5}Cr)O_8$ has a hue angle of 150.9°. Hence $Li_{1.5}Co_{0.5}(Ti_{2.5}Li_{0.5}Cr)O_8$ is a near perfect nickel-free substitute for BO3433. Solid solutions of the [124] spinel $CoLi(Ti_3Li)O_8$ with [134] $Li_2(Cr_2Ti_2)O_8$ spinels produce greener colors along the lines of Ferro's BO3433 without nickel.

Accordingly, an embodiment of the invention is a nickel-free green pigment comprising a solid solution of first and second mixed metal oxides, (a) the first mixed metal oxide comprising (i) at least one element A selected from the group consisting of lithium and sodium, (ii) at least one element B selected from the group consisting of cobalt, zinc, calcium, magnesium, and copper, and (iii) at least one element D selected from the group consisting of titanium, manganese, tin and germanium, (b) a second mixed metal oxide comprising (i) at least one element A selected from the group consisting of lithium and sodium, (ii) at least one element C selected from the group consisting of chromium, boron, iron, manganese, and aluminum, and (iii) at least one element D selected from the group consisting of titanium, manganese and germanium, and (c) no nickel.

Accordingly, an embodiment of the invention is a pigment comprising a solid Solution of (a) a [124] spinel having the formula $AB(D_3A)O_8$, where A is selected from the group consisting of Li and Na; B is selected from the group consisting of Co, Zn, Ca, Mg, and Cu; and D is selected from the group consisting of Ti, Mn, Sn, and Ge) with (b) a [134] spinel having the formula $A_2(C_2D_2)O_8$ wherein A is selected from the group consisting of Li and Na; C is selected from the group consisting of Cr, B, Fe, and Mn, and D is selected from the group consisting of Ti, Mn, Sn, and Ge, wherein the pigment exhibits a hue angle between 120 and 180°.

An embodiment of the invention is a method of making a nickel-free green pigment comprising a solid solution of first and second mixed metal oxides, the method comprising, (a) mixing particles of (i) a first mixed metal oxide comprising (1) at least one element A selected from the group consisting of lithium and sodium, (2) at least one element B selected from the group consisting of cobalt, zinc, calcium, magnesium, and copper, (3) at least one element D selected from the group consisting of titanium, manganese, tin and germanium, (4) no nickel, with (ii) a second mixed metal oxide comprising (1) at least one element A selected from the group consisting of lithium and sodium, (2) at least one element C selected from the group consisting of chromium, boron, iron, manganese and aluminum, and, (3) at least one element D selected from the group consisting of titanium, manganese, tin and germanium, and (4) no nickel, to form a mixture, and (b) heating the mixture at a temperature of 800-1700° C. for a time of 1 to 1000 minutes to form at least one of particles and agglomerates of a green pigment.

An embodiment of the invention is a method of imparting a green color to a substrate, comprising, (a) applying to a substrate and (b) firing a nickel-free green pigment comprising a solid solution of first and second mixed metal oxides, (i) the first mixed metal oxide comprising (1) at least one element A selected from the group consisting of lithium and sodium, (2) at least one element B selected from the group consisting of cobalt, zinc, calcium, magnesium, and copper, (3) at least one element D selected from the group consisting of titanium, manganese, tin and germanium, and (4) no nickel, (ii) the second mixed metal oxide comprising (1) at least one element A selected from the group consisting of lithium and sodium, (2) at least one element C selected from the group consisting of chromium, boron, iron, manganese and aluminum and, (3) at least one element D selected from the group consisting of titanium, manganese, tin and germanium, and (4) no nickel.

An embodiment of the invention is a method of imparting a green color to a plastic composition, comprising, melt mixing (a) a plastic composition, with (b) a nickel-free green pigment comprising a solid solution of first and second mixed metal oxides, (i) the first mixed metal oxide comprising (1) at least one element A selected from the group consisting of lithium and sodium, (2) at least one element B selected from the group consisting of cobalt, zinc, calcium, magnesium, and copper, (3) at least one element D selected from the group consisting of titanium, manganese, tin and germanium, and (4) no nickel, (ii) the second mixed metal oxide comprising (1) at least one element A selected from the group consisting of lithium and sodium, (2) at least one element C selected from the group consisting of chromium, boron, iron, manganese and aluminum, (3) at least one element D selected from the group consisting of titanium, manganese, tin and germanium, and (4) no nickel.

The subject pigment compositions are a solid solution of a [124] spinel and a [134] spinel. In one embodiment, the [124] spinel has the formula $BA(D_3A)O_8$. In one embodiment, the [134] spinel has the formula $A_2(C_2D_2)O_8$. In one embodiment, the [124] spinel has the formula $BA(D_3A)O_8$ and the [134] spinel has the formula $A_2(C_2D_2)O_8$. In one embodiment the [124] spinel has a formula selected from the group consisting of $(Co, Zn, Ca, Mg, Cu)(Li, Na)[(Ti, Mn, Sn, Ge)_3(Li, Na)]O_8$, $CoLi(Ti_3Li)O_8$ and $Co_{(1-x)}Zn_xLi(Ti_3Li)O_8$, where x is 0 to 1. In one embodiment, the [134] spinel has the formula $(Li, Na)[(Cr, B, Fe, Mn, Al)_2(Ti, Mn, Sn, Ge)_2]O_8$. In one embodiment the [124] spinel has a formula selected from the group consisting of $(Co, Zn, Ca, Mg, Cu)(Li, Na)[(Ti, Mn, Sn, Ge)_3(Li, Na)]O_8$, $CoLi(Ti_3Li)O_8$ and $Co_{(1-x)}Zn_xLi(Ti_3Li)O_8$, where x is 0 to 1 and the [134] spinel has the formula $(Li, Na)[(Cr, B, Fe, Mn, Al)_2(Ti, Mn, Sn, Ge)_2]O_8$.

In a preferred embodiment, the [134] spinel has the formula $Li_2(Cr_2Ti_2)O_8$.

In any embodiment of the invention, the pigment may include a first mixed metal oxide selected from the group consisting of $CoLi(Ti_3Li)O_8$, $CoLi(Ti_3Na)O_8$, $CoLi(Mn_3Li)O_8$, $CoLi(Ti_3Li)O_8$, $CoLi(Ge_3Li)O_8$, $CoLi(Mn_3Na)O_8$, $CoLi(Ti_3Na)O_8$, $CoLi(Ge_3Na)O_8$, $CoLi(Sn_3Li)O_8$, $CoLi(Sn_3Na)O_8$, $CoNa(Ti_3Li)O_8$, $CoNa(Ti_3Na)O_8$, $CoNa(Mn_3Li)O_8$, $CoNa(Ti_3Li)O_8$, $CoNa(Ge_3Li)O_8$, $CoNa(Mn_3Na)O_8$, $CoNa(Ti_3Na)O_8$, $CoNa(Ge_3Na)O_8$, $CoNa(Sn_3Li)O_8$, $CoNa(Sn_3Na)O_8$, $ZnLi(Ti_3Li)O_8$, $ZnLi(Ti_3Na)O_8$, $ZnLi(Mn_3Li)O_8$, $ZnLi(Ti_3Li)O_8$, $ZnLi(Ge_3Li)O_8$, $ZnLi(Mn_3Na)O_8$, $ZnLi(Ti_3Na)O_8$, $ZnLi(Ge_3Na)O_8$, $ZnLi(Sn_3Li)O_8$, $ZnLi(Sn_3Na)O_8$, $ZnNa(Ti_3Li)O_8$, $ZnNa(Ti_3Na)O_8$, $ZnNa(Mn_3Li)O_8$, $ZnNa(Ti_3Li)O_8$, $ZnNa(Ge_3Li)O_8$, $ZnNa(Mn_3Na)O_8$, $ZnNa(Ti_3Na)O_8$, $ZnNa(Ge_3Na)O_8$, $ZnNa(Sn_3Li)O_8$, $ZnNa(Sn_3Na)O_8$, $CaLi(Ti_3Li)O_8$, $CaLi(Ti_3Na)O_8$, $CaLi(Mn_3Li)O_8$, $CaLi(Ti_3Li)O_8$, $CaLi(Ge_3Li)O_8$, $CaLi(Mn_3Na)O_8$, $CaLi(Ti_3Na)O_8$, $CaLi(Ge_3Na)O_8$, $CaLi(Sn_3Li)O_8$, $CaLi(Sn_3Na)O_8$, $CaNa(Ti_3Li)O_8$, $CaNa(Ti_3Na)O_8$, $CaNa(Mn_3Li)O_8$, $CaNa(Ti_3Li)O_8$, $CaNa(Ge_3Li)O_8$, $CaNa(Mn_3Na)O_8$, $CaNa(Ti_3Na)O_8$, $CaNa(Ge_3Na)O_8$, $CaNa(Sn_3Li)O_8$, $CaNa(Sn_3Na)O_8$, $MgLi(Ti_3Li)O_8$, $MgLi(Ti_3Na)O_8$, $MgLi(Mn_3Li)O_8$, $MgLi(Ti_3Li)O_8$, $MgLi(Ge_3Li)O_8$, $MgLi(Mn_3Na)O_8$, $MgLi(Ti_3Na)O_8$, $MgLi(Ge_3Na)O_8$, $MgLi(Sn_3Li)O_8$, $MgLi(Sn_3Na)O_8$, $MgNa(Ti_3Li)O_8$, $MgNa(Ti_3Na)O_8$, $MgNa(Mn_3Li)O_8$, $MgNa(Ti_3Li)O_8$, $MgNa(Ge_3Li)O_8$, $MgNa(Mn_3Na)O_8$, $MgNa(Ti_3Na)O_8$, $MgNa(Ge_3Na)O_8$, $MgNa(Sn_3Li)O_8$, $MgNa(Sn_3Na)O_8$, $CuLi(Ti_3Li)O_8$, $CuLi(Ti_3Na)O_8$, $CuLi(Mn_3Li)O_8$, $CuLi(Ti_3Li)O_8$, $CuLi(Ge_3Li)O_8$, $CuLi(Mn_3Na)O_8$, $CuLi(Ti_3Na)O_8$, $CuLi(Ge_3Na)O_8$, $CuLi(Sn_3Li)O_8$, $CuLi(Sn_3Na)O_8$, $CuNa(Ti_3Li)O_8$, $CuNa(Ti_3Na)O_8$, $CuNa(Mn_3Li)O_8$, $CuNa(Ti_3Li)O_8$, $CuNa(Ge_3Li)O_8$, $CuNa $(Mn_3Na)O_8$, $CuNa(Ti_3Na)O_8$, $CuNa(Ge_3Na)O_8$, $CuNa(Sn_3Li)O_8$, $CuNa(Sn_3Na)O_8$ and combinations thereof.

In any embodiment of the invention, the pigment may include a second mixed metal oxide selected from the group consisting of $Li_2(Cr_2Ti_2)O_8$, $Li_2(Cr_2Mn_2)O_8$, $Li_2(Cr_2Sn_2)O_8$, $Li_2(Cr_2Ge_2)O_8$, $Li_2(B_2Ti_2)O_8$, $Li_2(B_2Mn_2)O_8$, $Li_2(B_2Sn_2)O_8$, $Li_2(B_2Ge_2)O_8$, $Li_2(Fe_2Ti_2)O_8$, $Li_2(Fe_2Mn_2)O_8$, $Li_2(Fe_2Sn_2)O_8$, $Li_2(Fe_2Ge_2)O_8$, $Li_2(Mn_2Ti_2)O_8$, $Li_2(Mn_2Sn_2)O_8$, $Li_2(Mn_2Ge_2)O_8$, $Li_2(Al_2Ti_2)O_8$, $Li_2(Al_2Mn_2)O_8$, $Li_2(Al_2Sn_2)O_8$, $Li_2(Al_2Ge_2)O_8$, $Na_2(Cr_2Ti_2)O_8$, $Na_2(Cr_2Mn_2)O_8$, $Na_2(Cr_2Ge_2)O_8$, $Na_2(Cr_2Sn_2)O_8$, $Na_2(B_2Ti_2)O_8$, $Na_2(B_2Mn_2)O_8$, $Na_2(B_2Ge_2)O_8$, $Na_2(B_2Sn_2)O_8$, $Na_2(Fe_2Ti_2)O_8$, $Na_2(Fe_2Mn_2)O_8$, $Na_2(Fe_2Ge_2)O_8$, $Na_2(Sn_2Mn_2)O_8$, $Na_2(Mn_2Ti_2)O_8$, $Na_2(Mn_2Ge_2)O_8$, $Na_2(Al_2Ti_2)O_8$, $Na_2(Al_2Mn_2)O_8$, $Na_2(Al_2Sn_2)O_8$, and $Na_2(Al_2Ge_2)O_8$ and combinations thereof.

The [124] and [134] spinels in the preceding two paragraphs may be combined in various molar ratios, for example 100:1 to 1:100, 50:1 to 1:50, 25:1 to 1:25, or 10:1 to 1:10 or values in between. The ratios may be calculated based on element A as set forth in the formulae $BA(D_3A)O_8$ or $A_2(C_2D_2)O_8$.

While the pigments of the invention do not include any intentionally added nickel, it is possible that residual nickel could be found in product pigments of the invention. Such nickel may occur naturally in combination with other transition metals used in the inventive pigments such as cobalt, manganese, iron, zinc and the like. In any case, regardless of the source, in one embodiment, the pigments of the invention have leachable nickel of less than 100 ppm, preferably less than 10 ppm, more preferably less than 1 ppm when measured in accordance with DIN EN71/3:2013.

Pigment Processing.

The final mixed spinels are formed by combining and calcining appropriate ratios of reactive compounds, usually salts, that contain the metals of interest. For example, carbonates, nitrates, oxalates, phosphates, hydroxides, fluorides, borates, boric acid, organometallics (such as alkoxides, ethoxides, methoxides, propoxides, butoxides, pentoxides, etc.), which include one or more of the metals (or metalloids) of concern, namely Co, Zn, Ca, Mg, Cu, Li, Na, Ti, Mn, Sn, Ge, Cr, B, Fe, Mn, and Al. The preceding sentence is intended to be read as disclosing every possible combination of named metal with every possible anion listed. The mixtures are calcined at 700-1700° C., preferably 700-1500° C., more preferably 800-1100° C., for 1-10000 minutes, preferably 1-1000 minutes more preferably 1-100 minutes, and milled to a desired particle size, for example 0.001-50 microns, 0.01-40 microns, 0.1-25 microns, or 1-10 microns. Most preferably, the calcining is done at 800-1100° C. for 60-360 minutes.

In the methods of the invention, the calcined pigment may be cooled, for example to room temperature at a rate of 1-50° C. per minute. The calcined pigment particles may be reduced in size by, for example, milling, to a $D_{50}$ particle size of 1-10 microns.

The starting particles of salts, (carbonates, nitrates, oxalates, etc.) may be of any size, but to improve reactivity and reduce processing times and costs, preferably have a $D_{90}$ particle size of less than 20 microns, more preferably less than 10 microns, still more preferably less than 6 microns, and even more preferably less than 5 microns.

IN certain embodiments, one or more mineralizers can be added in the amount of 0.01-10, preferably 0.01-5 wt % of the raw mixture to help forming the desired spinel, for example, NaCl, LiF, $Na_2SiF_6$, $Na_3(AlF_6)$, KCl, $NH_4Cl$, $BaF_2$, $CaF_2$, $H_3BO_3$, and others.

Applications. The pigments of the invention may be used to impart color to paints (and other coatings), curable coatings (such as radiation curable), inks, plastics, rubbers, ceramics, enamels, and glasses. Plastic or rubber substrate compositions that can be colored and marked using the green pigments according to this invention can be based upon polymeric materials that can be natural or synthetic. Halogenated polymers can be used. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produced by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methyacrylic acid esters, butadiene, as well as co polymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for laquers, paints, or printing inks such as linseed oil, nitrocellulose, melamine resins, acrylic resins, urea formaldehyde resins and the like. The pigmentary use of the present green pigments and compounds in other coatings or materials such as carbon-carbon composites may also provide advantages with regard to IR reflection. Also a plastic body as a substrate which would contain the pigment (such as vinyl siding) and/or any substrate (glass, ceramic, metal, plastic, composite) having thereon an organic coating or paint which would contain and utilize the high contrast laser markability, electronic properties, or low heat build-up properties of the green containing pigments of the invention.

Curable coatings. Representative useful thermoplastic polymers include polyolefins such as polyethylene and polypropylene, polyesters, polycarbonates, polysulfones, polyimides, polyamides, polyurethanes, acrylics, styrene acrylics, polyvinyl chlorides, and others. For certain high solid applications, thermoplastic polymers having a number average molecular weight less than 35,000, and optionally less than about 20,000, and optionally less than 10,000, will provide relatively low viscosity solutions when dissolved in suitable amounts of the unsaturated monomers, oligomers and reactants. Thermoplastic acrylic polymers are generally useful to provide favorable cost and performance characteristics, and are conveniently prepared by methods well known in the art such as by solution polymerization of acrylic and/or methacrylic monomers in an appropriate solvent or diluent.

An embodiment of the invention is a paint or coating comprising particles made by any method disclosed herein, wherein the paint or coating exhibits a total solar reflectance over black of at least 15% and preferably at least 20%, in accordance with ASTM E903, which is calculated based on standard reference spectral irradiance ASTM G173.

An embodiment of the invention is a paint or coating comprising nickel-free pigments disclosed elsewhere herein wherein the paint or coating exhibits a total solar reflectance over black of at least 15% and preferably at least 20%, in accordance with ASTM E903, which is calculated based on standard reference spectral irradiance ASTM G173.

An embodiment of the invention is a plastic composition comprising particles made by any method disclosed herein, wherein the plastic composition exhibits a total solar reflectance over black of at least 15% and preferably at least 20%, in accordance with ASTM E903, which is calculated based on standard reference spectral irradiance ASTM G173.

An embodiment of the invention is a plastic composition comprising nickel-free pigments disclosed elsewhere herein wherein the plastic composition exhibits a total solar reflectance over black of at least 15% and preferably at least 20%, in accordance with ASTM E903, which is calculated based on standard reference spectral irradiance ASTM G173.

When used in a plastic composition or curable coating, the green pigments of the invention may be used together with other pigments. Any mixed metal oxide pigment may be used in conjunction with the green pigments of the invention. Preferably, such additional pigments are also nickel-free in accordance with the goals of the invention. However, in some embodiments, nickel-containing pigments may be used. Pigments such as Pigment Yellow 184, Pigment Yellow 227, Pigment Orange 82 and Pigment Yellow 216 may be used in any combination with the green pigments of the invention. Also, singly or in combination, BiV, SnTiZn and NiTiO3 may be used.

An embodiment of the invention is a plastic, rubber or curable coating as set forth in the preceding two paragraphs including a green pigment particle disclosed elsewhere herein or made by any method disclosed elsewhere herein.

EXAMPLES

The following examples illustrate, but do not limit, the scope of the invention.

Example 1

The compound $Li_{1.5}Co_{0.5}(Ti_{2.5}Li_{0.5}Cr)O_8$ is produced by dry mixing of the metal oxides or carbonates (Table 1, below) followed by calcining at 900° C. for 8 hours in open saggers and wet milling to $D_{90}$ of 4.5 microns.

TABLE 1

| Recipe to produce $Li_{1.5}Co_{0.5}(Ti_{2.5}Li_{0.5}Cr)O_8$ | |
| --- | --- |
| 19.09 kg | lithium carbonate |
| 9.68 kg | cobalt oxide |
| 51.59 kg | titanium dioxide |
| 19.64 kg | chromium oxide |

The production of $Li_{1.5}Co_{0.5}(Ti_{2.5}Li_{0.5}Cr)O_8$ can be exemplified by the following reaction:

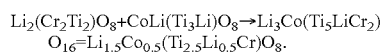

$Li_2(Cr_2Ti_2)O_8 + CoLi(Ti_3Li)O_8 \rightarrow Li_3Co(Ti_5LiCr_2)O_{16} = Li_{1.5}Co_{0.5}(Ti_{2.5}Li_{0.5}Cr)O_8$.

The pigment ($Li_{1.5}Co_{0.5}(Ti_{2.5}Li_{0.5}Cr)O_8$) produces the following coloristic properties (CIELab D65 10°), where the Masstone sample includes 6.4 g Plastisol and 0.3 g Pigment, while the Tint sample includes 6.4 grams Plastisol; 0.3 grams Pigment and 0.1.2 grams $TiO_2$-Color values (CIELab D65 10°) of that trial measured in Plastisol:

| | Masstone | Tint |
| --- | --- | --- |
| L* | 45.9 | 74.4 |
| a* | −26 | −18.2 |
| b* | 14.4 | 10.2 |
| Hue Angle | 151.1° | 150.9° |

The plastisol in this and all examples is a suspension of PVC in a liquid plasticizer, which is a standard formulation commercially available from: Rottolin-Werk—Julius Rotter & Co. KG, Bayreuth, Germany; and has the product name: Plastisol Typ U91.7.0.429.59.

In addition, the TSR (over Black) of this compound is 31 as compared to a conventional Ni containing Pigment, which exhibits a TSR of 22 when identically formulated. TSR is measured in accordance with ASTM E903, which is calculated based on standard reference spectral irradiance ASTM 6173.

Example 2

$Li_4Co_3(Ti_{11}Li_3Cr_2)O_{32}$

The following oxides and carbonates are dry mixed, followed by calcining at 900° C. for 8 hours in open saggers, followed by wet milling to d90 of 4.3 microns.

| Recipe: | |
| --- | --- |
| 19.06 kg | lithium carbonate |
| 14.49 kg | cobalt oxide |
| 56.65 kg | titanium dioxide |
| 9.8 kg | chromium oxide |

Color values (CIELab D65 10°) of that trial measured in Plastisol:

| | Masstone | Tint |
| --- | --- | --- |
| L* | 45.9 | 74.8 |
| a* | −31.5 | −22 |
| b* | 7.2 | 4.4 |

Example 3

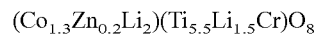

$(Co_{1.3}Zn_{0.2}Li_2)(Ti_{5.5}Li_{1.5}Cr)O_8$

The following oxides and carbonates are dry mixed, followed by calcining at 900° C. for 8 hours in open saggers, followed by wet milling to d90 of 4.4 microns.

| Recipe: | |
| --- | --- |
| 8.53 kg | lithium carbonate |
| 6.42 kg | cobalt oxide |
| 27.97 kg | titanium dioxide |
| 5.01 kg | chromium oxide |
| 1.07 Kg | Zinc oxide |

Color values (CIELab D65 10°) of that trial measured in Plastisol:

| | Masstone | Tint |
| --- | --- | --- |
| L* | 49 | 75.6 |
| a* | −31.3 | −21.4 |
| b* | 8.5 | 5.0 |

Example 4

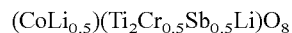

$(CoLi_{0.5})(Ti_2Cr_{0.5}Sb_{0.5}Li)O_8$

The following oxides and carbonates are dry mixed, followed by calcining at 900° C. for 8 hours in open saggers, followed by wet milling to d90 of 4.4 microns.

| Recipe: | |
|---|---|
| 8.45 kg | lithium carbonate |
| 11.42 kg | cobalt oxide |
| 24.34 kg | titanium dioxide |
| 5.79 kg | chromium oxide |
| 10.34 kg | antimony oxide |

| Color values (CIELab D65 10°) of that trial measured in Plastisol: | | |
|---|---|---|
| | Masstone | Tint |
| L* | 41.3 | 72.4 |
| a* | −20.9 | −16 |
| b* | 8.5 | 5.8 |

Example 5

$LiCo_{0.5}(Ti_{2.5}LiCr)O_8$, with Mineralizer

The following oxides and carbonates are dry mixed, followed by calcining at 900° C. for 8 hours in open saggers, followed by wet milling to d90 of 5.3 microns.

| Recipe: | |
|---|---|
| 37.80 kg | lithium carbonate |
| 19.16 kg | cobalt oxide |
| 103.18 kg | titanium dioxide |
| 38.89 kg | chromium oxide |
| 2 kg | Ammonium chloride |

| Color values (CIELab D65 10°) of that trial measured in Plastisol: | | |
|---|---|---|
| | Masstone | Tint |
| L* | 46.2 | 74.3 |
| a* | −27.2 | −19.2 |
| b* | 15.0 | 10.3 |

Test of Example 1 & 2 Pigments on a Flat Glass Enamel

Pigments from Examples 1 & 2 were tested with 15% pigment and 85% glass flux 104007, lead-free, commercially available from Ferro corporation, Cleveland, Ohio. The pigment/glass mixture was screen printing on 4 mm float glass and fired at 690° C. for 3 min.

The resultant color values (CIELab D65 10°) were:

| | Example 1 | Example 2 |
|---|---|---|
| L* | 48.7 | 46.5 |
| a* | −29.1 | −31.7 |
| b* | 17.7 | 13.5 |

In the spectrum in FIG. 1, the upper curve represents the inventive pigment $Li_{1.5}Co_{0.5}(Ti_{2.5}Li_{0.5}Cr)O_8$. The lower curve represents Ferro's conventional Nickel-containing green pigment (BO3433). The vertical dashed lines represent the bounds of the visible spectrum. The inventive nickel-free pigment provides increased reflectance over the conventional nickel-containing green pigment over virtually the entire EM spectrum from 250 to 2500 nanometers, especially in the overall infrared region and especially the near infrared region.

The subject pigment compositions can exhibit improved solar reflectance properties such that the pigment compositions reflect a relatively high proportion of light having a wavelength between 780 and 2500 nm (i.e., the infrared spectrum), while reflecting a relatively low proportion of light having a wavelength between 380 and 780 nm (i.e., the visible spectrum), which shows either light-tone or dark-tone colors. These unique reflection characteristics enable the preferred pigment compositions to selectively reflect infrared (IR) radiation while not significantly reflecting light within the visible spectrum.

Hence, the inventive pigments exhibit significant reflectance in the near infrared range and relatively low (under 25%) in the visible range. Naturally, as a green pigment, the inventive pigment exhibits a reflectance peak in the 500-550 nm range.

Thus, the pigment compositions maintain their desired appearance and color, e.g., green, while also reflecting significant amounts of IR radiation.

The foregoing and other features of the invention are hereinafter more fully described and particularly pointed out in the claims, the following description setting forth in detail certain illustrative embodiments of the invention, these being indicative, however; of but a few of the various ways in which the principles of the invention may be employed.

The invention claimed is:

1. A nickel-free green pigment comprising a solid solution of first and second mixed metal oxides,
   a. the first mixed metal oxide having a [124] spinel structure, comprising
      i. at least one element A selected from the group consisting of lithium and sodium,
      ii. at least one element B selected from the group consisting of cobalt, zinc, calcium, magnesium, and copper,
      iii. at least one element D selected from the group consisting of titanium, manganese, tin and germanium, and
   b. the second mixed metal oxide having a [134] spinel structure, comprising
      i. at least one element A selected from the group consisting of lithium and sodium,
      ii. at least one element C selected from the group consisting of chromium, boron, iron, manganese and aluminum and,
      iii. at least one element D selected from the group consisting of titanium, manganese, tin and germanium, and
   c. no nickel.

2. The nickel-free green pigment of claim 1, wherein the first mixed metal oxide has the formula $BA(D_3A)O_8$.

3. The nickel-free green pigment of claim 1, wherein the second mixed metal oxide has the formula $A_2(C_2D_2)O_8$.

4. A paint or coating including the nickel-free green pigment of claim 1.

5. The paint or coating of claim 1 having a TSR over black of at least 15.

6. A plastic composition including the nickel-free green pigment of claim 1.

7. The nickel-free green pigment of claim 1 having a reflection of at least 50% over a wavelength range of 800-1100 nm.

8. The nickel-free green pigment of claim 1 having leachable Ni of less than 1 ppm according to DIN EN71/3:2013.

9. A method of making a nickel-free green pigment comprising a solid solution of first and second mixed metal oxides, the method comprising,
a. mixing particles of
i. a first mixed metal oxide having a [124] spinel structure, comprising
1. at least one element A selected from the group consisting of lithium and sodium,
2. at least one element B selected from the group consisting of cobalt, zinc, calcium, magnesium, and copper,
3. at least one element D selected from the group consisting of titanium, manganese, tin and germanium,
4. no nickel
with
ii. a second mixed metal oxide having a [134] spinel structure, comprising
1. at least one element A selected from the group consisting of lithium and sodium,
2. at least one element C selected from the group consisting of chromium, boron, iron, manganese and aluminum, and,
3. at least one element D selected from the group consisting of titanium, manganese, tin and germanium,
4. no nickel,
to form a mixture, and
b. heating the mixture at a temperature of 800-1700° C. for a time of 1 to 1000 minutes to form at least one of particles and agglomerates of a green pigment.

10. The method of claim 9, further comprising cooling the green pigment to room temperature at a rate of 1-50° C. per minute.

11. The method of claim 9, further comprising reducing the size of the pigment particles or agglomerates to a $D_{50}$ size of 1-10 microns.

12. The method of claim 9, wherein the first mixed metal oxide has the formula $BA(D_3A)O_8$.

13. The method of claim 9, wherein the second mixed metal oxide has the formula $A_2(C_2D_2)O_8$.

14. A method of imparting a green color to a substrate, comprising,
a. applying to a substrate and
b. firing
a nickel-free green pigment comprising a solid solution of first and second mixed metal oxides,
i. the first mixed metal oxide having a [124] spinel structure, comprising
1. at least one element A selected from the group consisting of lithium and sodium,
2. at least one element B selected from the group consisting of cobalt, zinc, calcium, magnesium, and copper,
3. at least one element D selected from the group consisting of titanium, manganese, tin and germanium, and
4. no nickel,
ii. the second mixed metal oxide having a [134] spinel structure, comprising
1. at least one element A selected from the group consisting of lithium and sodium,
2. at least one element C selected from the group consisting of chromium, boron, iron, manganese and aluminum and,
3. at least one element D selected from the group consisting of titanium, manganese, tin and germanium, and
4. no nickel.

15. The method of claim 14, wherein the first mixed metal oxide has the formula $BA(D_3A)O_8$.

16. The method of claim 14, wherein the second mixed metal oxide has the formula $A_2(C_2D_2)O_8$.

17. The method of claim 15, wherein the second mixed metal oxide has the formula $A_2(C_2D_2)O_8$.

18. The method of claim 14, wherein the substrate is selected from the group consisting of paints, curable coatings, inks, plastics, rubbers, ceramics, enamels, and glasses.

19. A method of imparting a green color to a plastic composition, comprising, melt mixing
a. a plastic composition, with
b. a nickel-free green pigment comprising a solid solution of first and second mixed metal oxides,
i. the first mixed metal oxide having a [124] spinel structure, comprising
1. at least one element A selected from the group consisting of lithium and sodium,
2. at least one element B selected from the group consisting of cobalt, zinc, calcium, magnesium, and copper,
3. at least one element D selected from the group consisting of titanium, manganese, tin and germanium, and
4. no nickel,
ii. the second mixed metal oxide having a [134] spinel structure, comprising
1. at least one element A selected from the group consisting of lithium and sodium,
2. at least one element C selected from the group consisting of chromium, boron, iron, manganese and aluminum,
3. at least one element D selected from the group consisting of titanium, manganese, tin and germanium, and
4. no nickel.

20. The method of claim 19, wherein the first mixed metal oxide has the formula $BA(D_3A)O_8$.

21. The method of claim 19, wherein the second mixed metal oxide has the formula $A_2(C_2D_2)O_8$.

22. The method of claim 20, wherein the second mixed metal oxide has the formula $A_2(C_2D_2)O_8$.

* * * * *